United States Patent
Coty (10) Patent No.: US 8,523,108 B2
(45) Date of Patent: Sep. 3, 2013

(54) HEAT SHIELD INSTALLATION FOR AIRCRAFT WHEEL TO IMPROVE CONVECTIVE COOLING OF AIRCRAFT BRAKE

(75) Inventor: Brian M. Coty, Tipp City, OH (US)

(73) Assignee: Goodrich Corporation, Charlotte, NC (US)

( * ) Notice: Subject to any disclaimer, the term of this patent is extended or adjusted under 35 U.S.C. 154(b) by 277 days.

(21) Appl. No.: 13/071,335

(22) Filed: Mar. 24, 2011

(65) Prior Publication Data

US 2012/0241557 A1 Sep. 27, 2012

(51) Int. Cl.
*B64C 25/42* (2006.01)

(52) U.S. Cl.
USPC ......... 244/111; 188/71.6; 188/264 G; 301/6.3

(58) Field of Classification Search
USPC ................ 244/111, 110 A, 103 R; 188/71.6, 188/264 G; 301/6.3, 6.2
See application file for complete search history.

(56) References Cited

U.S. PATENT DOCUMENTS

| | | | |
|---|---|---|---|
| 3,051,528 A * | 8/1962 | Rogers | 301/6.3 |
| 3,958,833 A * | 5/1976 | Stanton | 301/6.2 |
| 3,983,974 A | 10/1976 | Dowell et al. | |
| 4,585,096 A * | 4/1986 | Bok | 188/73.37 |
| 5,002,342 A * | 3/1991 | Dyko | 301/6.91 |
| 5,236,249 A * | 8/1993 | Han et al. | 301/6.91 |
| 5,248,013 A | 9/1993 | Hogue et al. | |
| 6,419,056 B1 | 7/2002 | Dyko | |
| 6,915,880 B2 * | 7/2005 | Swales | 188/18 A |
| 7,255,208 B2 | 8/2007 | Rea | |
| 7,546,910 B2 * | 6/2009 | Thorp et al. | 188/71.6 |
| 2005/0224634 A1 | 10/2005 | Rea | |

FOREIGN PATENT DOCUMENTS

EP 0555822 8/1993
WO 2008097386 8/2008

OTHER PUBLICATIONS

European Search Report dated Jul. 2, 2012 in Application No. 11250942.7.

* cited by examiner

*Primary Examiner* — Christopher P Ellis
(74) *Attorney, Agent, or Firm* — Snell & Wilmer L.L.P.

(57) ABSTRACT

Improved chin rings are disclosed, wherein a chin ring may comprise a substantially circular chin ring having an outer surface and a slot, a first radially spaced aperture in the chin ring on a first side of the slot, a second radially spaced aperture in the chin ring on a second side of the slot, a first louver disposed at least partially over the first radially spaced aperture, the first louver disposed at a first angle relative to the outer surface and a second louver disposed at least partially over the second radially spaced aperture.

14 Claims, 6 Drawing Sheets

FIG. 6

HEAT SHIELD INSTALLATION FOR AIRCRAFT WHEEL TO IMPROVE CONVECTIVE COOLING OF AIRCRAFT BRAKE

FIELD

The present disclosure is related to a heat shield (sometimes called a "chin ring"), for example, a chin ring for use in an aircraft wheel & brake assembly.

BACKGROUND

During the braking of an aircraft, the alternately splined stator and rotor discs of the aircraft brakes are brought into sliding contact with another, generating considerable heat energy. Dissipation of this heat energy is desired to reduce or eliminate the deteriorative effects on the wheel and tire structure which, in certain instances such as an aborted or rejected take-off, can result in sufficiently high temperatures that may result in tire ruptures or fires.

The heat energy generated within the braking elements of the stators and rotors (hereinafter also referred to as the heat sink), of an aircraft brake may dissipate via conduction, radiation and convection to the adjacent braking components, such as the wheel assembly, bearings, pistons and other adjacent structures, as well as an associated tire. While dissipation of heat energy is desirable, it is also desirable to protect these adjacent structures. In certain braking systems, the heat sink is of greater axial dimension than the wheel rim member into which the heat sink extends. In such a braking system, it is important to protect the tire from excessive radiant heat and the heat sink from contaminants such as water, de-icing chemicals, and other debris. One manner of protecting these is to provide a heat shield between the heat generating elements of the heat sink (e.g., the stators and rotors) and the wheel assembly and its adjacent components and bearings.

In this regard, a chin ring may be attached to an aircraft wheel to prevent an aircraft tire from being heated by radiant energy emitted from the heat sink (tire being in the "line of sight" of the heat sink components). Blocking the line of sight between the two components reduces or prevents heat from the aircraft brake from radiating to the aircraft tire, preventing excessive aircraft tire temperatures that could lead to tire damage or fire. However, a continuous surface chin ring acts to retain heat within the aircraft brake. Thus, improved chin rings are desirable to facilitate cooling of an aircraft brake.

SUMMARY

Systems and methods disclosed herein may be useful for use in chin rings. In this regard, an apparatus is provided comprising a substantially circular chin ring having an outer surface and a slot, a first radially spaced aperture in the chin ring on a first side of the slot, a second radially spaced aperture in the chin ring on a second side of the slot, a first louver disposed at least partially over the first radially spaced aperture, the first louver disposed at a first angle relative to the outer surface, a second louver disposed at least partially over the second radially spaced aperture, and the second louver disposed at a second angle relative to the outer surface.

Moreover, an apparatus is provided comprising a substantially circular support structure, a substantially circular shield structure coupled to the support structure, a first radially spaced aperture in the shield structure on a first side of the slot, a second radially spaced aperture in the shield structure on a second side of the slot, a first louver disposed at least partially over the first radially spaced aperture, the first louver disposed at a first angle relative to the outer surface, a second louver disposed at least partially over the second radially spaced aperture, and the second louver disposed at a second angle relative to the outer surface.

In further embodiments, an aircraft component is provided comprising an aircraft wheel housing defining a substantially cylindrical volume having a circumference, a chin ring having an outer surface and a slot, the chin ring circumferentially coupled to the aircraft wheel housing, a first radially spaced aperture in the chin ring on a first side of the slot, a second radially spaced aperture in the chin ring on a second side of the slot, wherein the chin ring comprises a first louver set comprising a first set louver and a second louver set comprising a second set louver, and wherein the first set louver is disposed at a first angle relative to the second set louver.

DETAILED DESCRIPTION

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for heat shields or chin rings used on aircraft. Although the embodiments herein are described with reference to chin rings used in connection with aircraft brakes, such embodiments are provided as examples only, as it is contemplated that the disclosures herein have applicability to other vehicles and braking systems.

A chin ring may be useful to protect certain components (e.g., aircraft tires and aircraft wheels) from excessive heat generated by a brake (e.g., aircraft brake). However, a continuous surface chin ring that simply provides a thermal barrier between the aircraft brake and other aircraft components tends to inhibit brake cooling. Thus, it is beneficial to allow the heat from an aircraft brake to be exchanged with the ambient environment, while protecting other aircraft components from excessive heat.

Improved chin rings, in accordance with various embodiments, provide cooling by facilitating a convective current that transports heat away from the brake, among other things. In various embodiments, a chin ring is provided that blocks radiant heat from an aircraft brake from reaching other aircraft components. In various embodiments, a chin ring may conduct heat away from an aircraft brake.

In various embodiments, a chin ring may comprise radially spaced apertures that are partially covered by louvers to facilitate air movement (and therefore, convection) both into and out of the aircraft brake. In this regard, the louvers tend to block thermal radiation from the aircraft brake to other aircraft components. Louvers may be disposed about the apertures to improve convective current flow during wheel rotation by encouraging a cycle of air intake and air exhaust. The convective flow may cool the aircraft brake as well as the chin ring itself. Portions of the aircraft wheel assembly (e.g., a torque bar or wheel sections) may be in contact with the chin ring and may thus be cooled by conduction. For example, a torque bar in physical communication with a chin ring may be cooled both by the convective current flow and by conduction.

Figure 1:
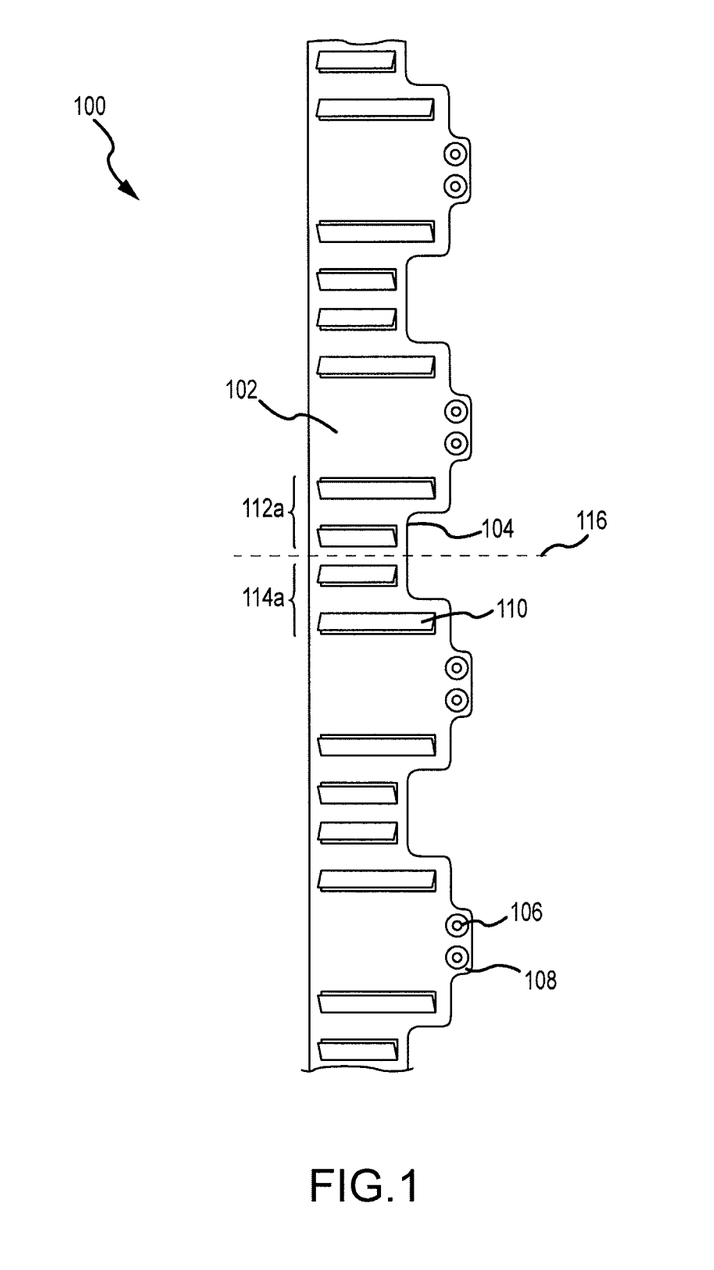
FIG. 1 illustrates a chin ring in accordance with an embodiment.
Figure 2:
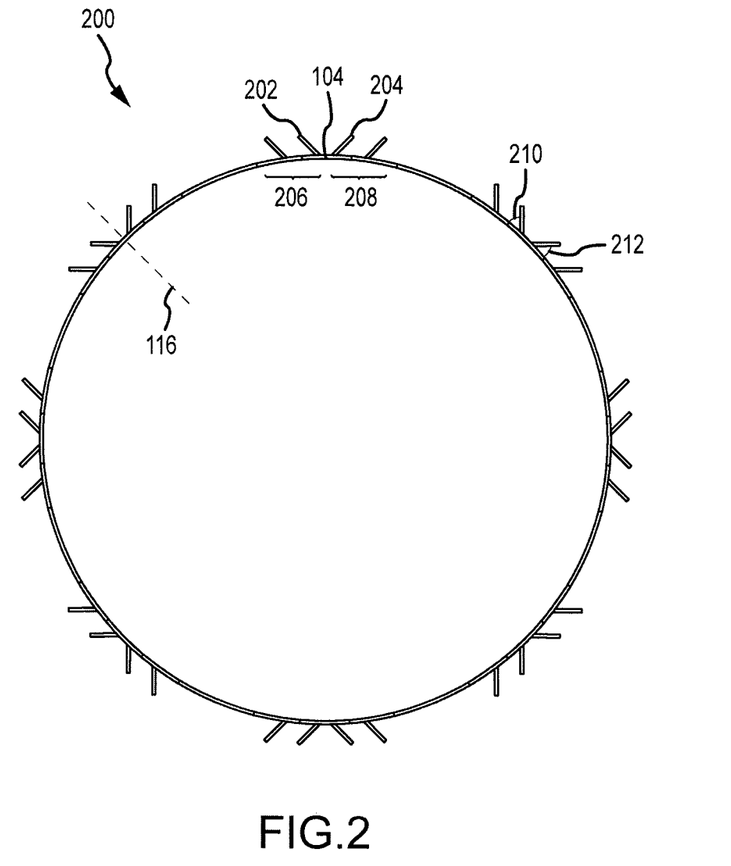
FIG. 2 illustrates a different perspective of the chin ring of FIG. 1

With reference to FIG. 1, chin ring assembly 100 is shown. Chin ring 102 comprises slots 104 and radially spaced apertures 110. Apertures 110 are arranged in sets, such as aperture set 112a and aperture set 114a. Apertures 110 each have a louver disposed at least partially over each aperture. Exemplary louvers are shown in the perspective of FIG. 2, for example, as in louver 202. In various embodiments, chin ring 102 also comprises securing tab 108 for coupling to an aircraft wheel. In such embodiments, securing tab 108 comprises securing aperture 106 for acceptance of a fastener or fastener-like device to securely couple chin ring 102 to an aircraft wheel.

Slots 104 are disposed about the chin ring. In various embodiments, there are any suitable number of slots 104 and may be configured to match the number of torque drives in the aircraft wheel and brake assembly. In various embodiments, slots 104 are configured to accept an aircraft wheel torque drive. Similarly, a chin ring may have a number of slots that are selected in size and number to accommodate a given number of torque drives.

Figure 3:
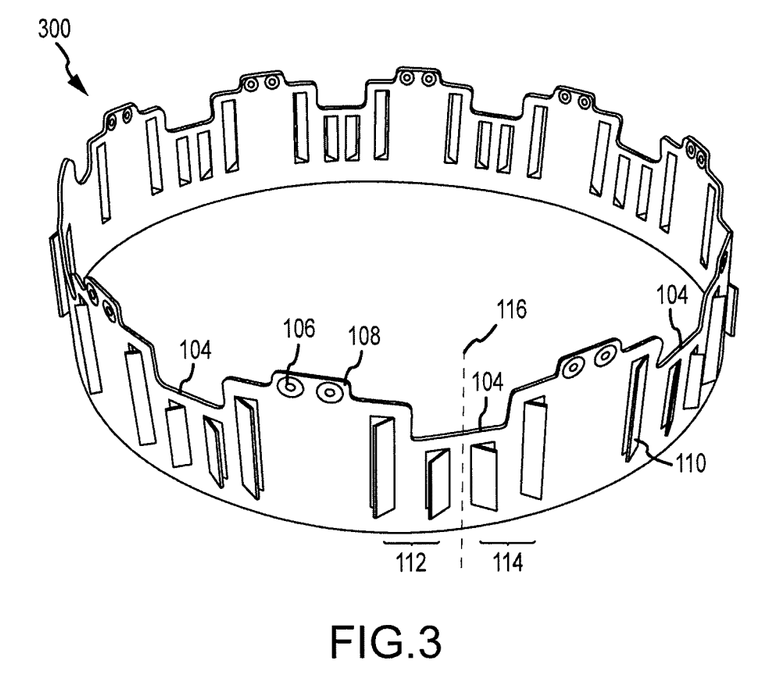
FIG. 3 illustrates a further perspective of the chin ring of FIG. 1.

In an embodiment, apertures 110 are arranged in pairs symmetrically about a slot. For example, as illustrated in FIGS. 1-3, aperture set 112a and aperture set 114a each contain two apertures 110. However, in various embodiments, any configuration and/or number of apertures 110 is contemplated. For example, apertures may comprise aperture sets. Aperture sets may comprise aperture singletons or aperture couplets disposed about a slot, though an aperture set may comprise any number of apertures. Aperture sets may be disposed symmetrically about a slot. While it has been found to be advantageous to dispose the same number of apertures about a given slot, in various embodiments, a slot may be surrounded by two aperture sets, each having a different number of apertures within the aperture set. Selection of the number of apertures to dispose about a slot may be a function of the surface area of the aperture. Thus, a couplet of apertures may be appropriate where the combined surface area of the couplet is similar to the combined surface area of a triplet of apertures. Each aperture in an aperture set may be of equal surface area, but in various embodiments, apertures in an aperture set need not be of the same surface area. For example, aperture set 112a comprises two apertures having different surface areas.

In various embodiments, apertures 110 are disposed radially about the chin ring. As is described herein, axial disposition of apertures about a chin ring enables and enhances the convective currents through the chin ring, and advantage not found in other configurations such as circumferentially spaced apertures. Apertures 110 are of rectangular shape, though other geometric shapes of apertures are contemplated herein. In various embodiments, apertures have an aspect ratio (expressed as ratio of width to height) of about 2:1 to 5:1, though other aspect ratios are contemplated. Apertures 110 may be of different aspect ratios, and apertures in a given aperture set may be of different aspect ratios.

Apertures 110 each have a louver disposed at least partially over each aperture. The louver may be disposed at an angle relative to an outer surface of chin ring 102. As noted above, the louver tends to interrupt the "line of sight" between the interior of the aircraft brake and other aircraft components, such as the aircraft tire. Thus, the louver acts to absorb radiant heat. While any angle is contemplated herein, it is preferable to dispose the louver at an angle of between about 10 degrees and about 50 as measured relative to an outer surface of chin ring 102.

In addition, the radial louver tends to direct airflow about the chin ring. Louver positioning may thus be used to create convective currents between the wheel and brake. Aircraft brakes may reach temperatures as high as 1000° F. to 1500° F. during braking, and thus are typically of a much higher temperature than the ambient air. Convective currents may operate effectively where relatively cool ambient air (e.g., air between about −20° F. and about 120° F.) is drawn over and around an aircraft brake, heated by the aircraft brake, drawing heat from the heat sink, and then expelled from the aircraft brake. By selecting louver position appropriately, the louvers may act to draw in ambient air through the rotation of the aircraft wheel and also expel or exhaust the air from around the aircraft brake heat sink. For example, a first aperture set may be symmetrically disposed about an axis relative to a second aperture set. In this manner, the first aperture set will act to draw air under the chin ring and the second aperture set will act to expel air from the around the brake heat sink. The direction of the airflow would be reversed if the direction of the rotation of the aircraft wheel is reversed. In this manner, a single chin ring may be used in connection with any aircraft wheel, no matter the orientation of rotation.

For example, with reference to FIGS. 1 and 2, slots 104 each have axis of symmetry 116. Louver 202 is disposed about axis of symmetry 116 relative to louver 204, which is known as reflection symmetry. As shown in FIG. 2, the open end of louver 202 and louver 204 are facing opposite directions.

Louver set 206 is disposed symmetrical to louver set 208. Louver set 206 and louver set 208 each comprise two louvers having corresponding apertures. If chin ring assembly 200 is coupled with a clockwise rotating aircraft wheel, air would be drawn in through louver set 206 and expelled through louver set 208. The opposite effect would be observed in a counter-clockwise rotating aircraft wheel.

FIG. 3 illustrates chin ring assembly 300, which is a different perspective of chin ring assembly 100. Securing tab 108 is shown having securing aperture 106. Securing tab 108 may be coupled with an aircraft wheel so that it at least partially overlaps a portion of the aircraft wheel. Securing aperture 106 may accommodate a fastener to secure the chin ring assembly 300 to an aircraft wheel. Any suitable fastener may be used, such as a screw or rivet. In various embodiments, the securing aperture may be omitted in favor of a securing portion, which may be welded or press fit onto an aircraft wheel. However, it is advantageous to allow the chin ring assembly 100 to be easily removable from the aircraft wheel so as to ease aircraft repair and maintenance. Thus, the use of securing aperture 106 with a bolt, screw or screw like fastener is advantageous.

Many aircraft wheels have housings that include a rim flange. In various embodiments, the chin ring may be mounted underneath an aircraft wheel rim flange, such that heat from the flange may conduct into the chin ring. In such embodiments, the chin ring may have a diameter less than that of the aircraft wheel rim flange. In various embodiments, however, the chin ring may have a diameter larger than that of the aircraft wheel rim flange and may thus be mounted above the flange. As noted above, in addition to facilitating brake cooling by blocking radiant heat and facilitating a convective current, a chin ring may also facilitate cooling by conduction. A chin ring may be in physical communication with the wheel rim flange through the torque drive, such as a torque drive disposed in slots 104. Thus, heat from the torque drive may conduct into the chin ring. The chin ring, which may be exposed to ambient air and which may have convective currents flowing through it during wheel rotation, may thus partially or fully rid itself of the heat it receives by conduction from the torque bar.

The chin ring may be constructed of any suitable material, such as a metal, ceramic, or metal/ceramic composite material. In various embodiments, the chin ring may be made of any grade or type of stainless steel, though in various embodiments aluminum may be used. In various embodiments, portions of the chin ring, such as the louvers, may be made of a material that is different from other portions of the chin ring.

The chin ring may be formed in any suitable manner for working the selected material. For example, a ceramic chin ring may be formed by sintering. A metal chin ring may be formed by casting, forging, stamping, or cutting. In various embodiments, a chin ring may be formed from a sheet of stainless steel. The stainless steel sheet may be stamped, laser cut or water jet cut into a strip comprising slots and securing tabs. The strip may then be polished or sanded, if so desired The strip may then have apertures cut or otherwise formed within it. The apertures may be formed by laser cutting, water jet cutting, or stamping, for example. In various embodiments, however, the apertures may be formed during casting. The apertures may be formed by cutting only three sides of the aperture. The remaining material within the aperture may be bent to a desired angle to form the louver. For example, a water jet may cut three sides of an aperture and then pressure may be applied to bend or otherwise move the interior of the aperture. Thus, a louver is formed. In this manner, a louver may be formed while limiting waste material. In further embodiments, apertures may be cut into the strip and louvers may be attached to at least partially cover the apertures. In still further embodiments, a water jet may cut one side of an aperture and then pressure may be applied to bend or otherwise move the interior of the aperture.

The strip may then be shaped into a desired shape such that the ends of the strip meet. For example, the strip may be bent around a circular mould so that the ends of the strip meet at a point. The junction of the ends of the strip may then be welded or otherwise joined together. In various embodiments, a fastener is used to join the ends of the strip, although in further embodiments welding is used. Welding enhances the structural integrity of the chin ring, and often produces a lighter weight chin ring. Any suitable form of welding may be used to join the ends of the strip.

Empirical testing has shown that chin rings in accordance with various embodiments provide more effective cooling than conventional (continuous surface) chin rings. Aircraft brake cooling is simulated on an aircraft brake simulation device (dynamometer) using a conventional chin ring and a chin ring in accordance with various embodiments comprising axially disposed apertures having systematically positioned louvers. The temperature of the aircraft wheel flange after the simulation is about 15° F. less when using a chin ring in accordance with various embodiments. The temperature of the aircraft wheel tubewell after the simulation is 20° F. less using a chin ring in accordance with various embodiments as against the conventional chin ring. The temperature of the aircraft brake fuse plug after the simulation is about 20° F. less using a chin ring in accordance with various embodiments. The temperature of the aircraft brake torque drive after the simulation is about 165° F. less using a chin ring in accordance with various embodiments. The temperature of the aircraft wheel torque drive spacer after the simulation is about 125° F. less using a chin ring in accordance with various embodiments. The temperature of the aircraft wheel rim flange (the mounting point on the aircraft wheel housing) after the simulation is about 30° F. less using a chin ring in accordance with various embodiments.

Figure 4:
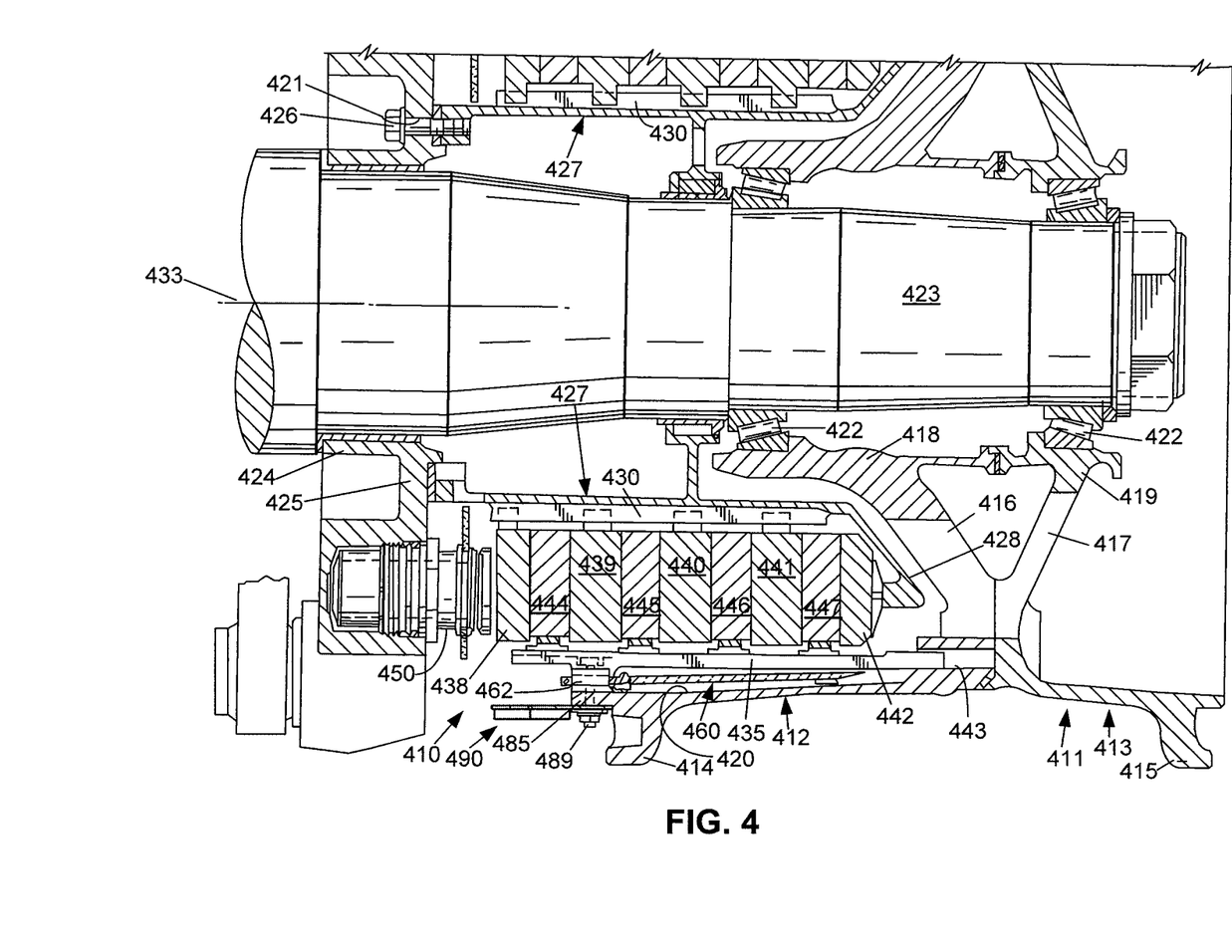
FIG. 4 illustrates an aircraft wheel and brake assembly with an installed chin ring according to various embodiments.
Figure 5:
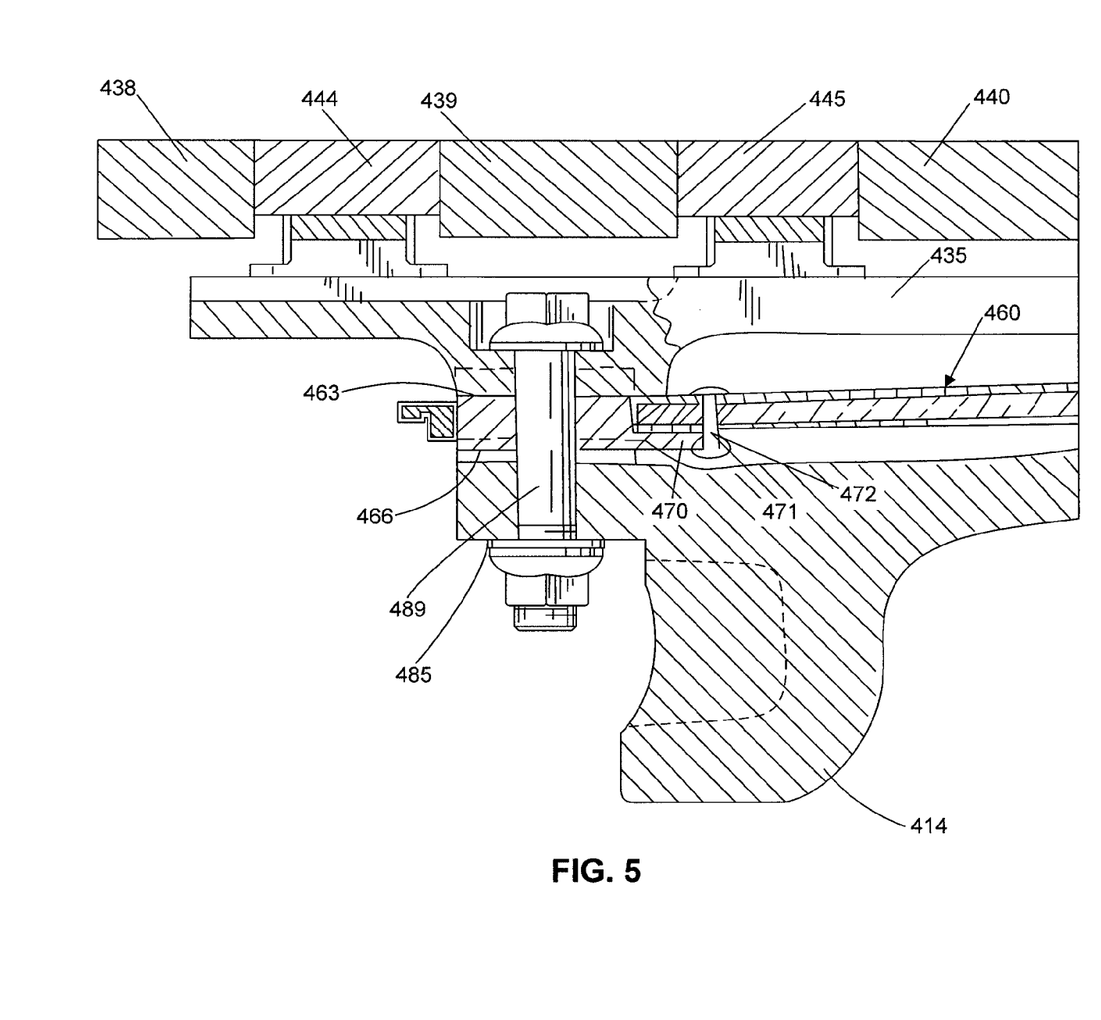
FIG. 5 illustrates a portion of the aircraft wheel and brake assembly of FIG. 4, without a chin ring installed.
Figure 6:
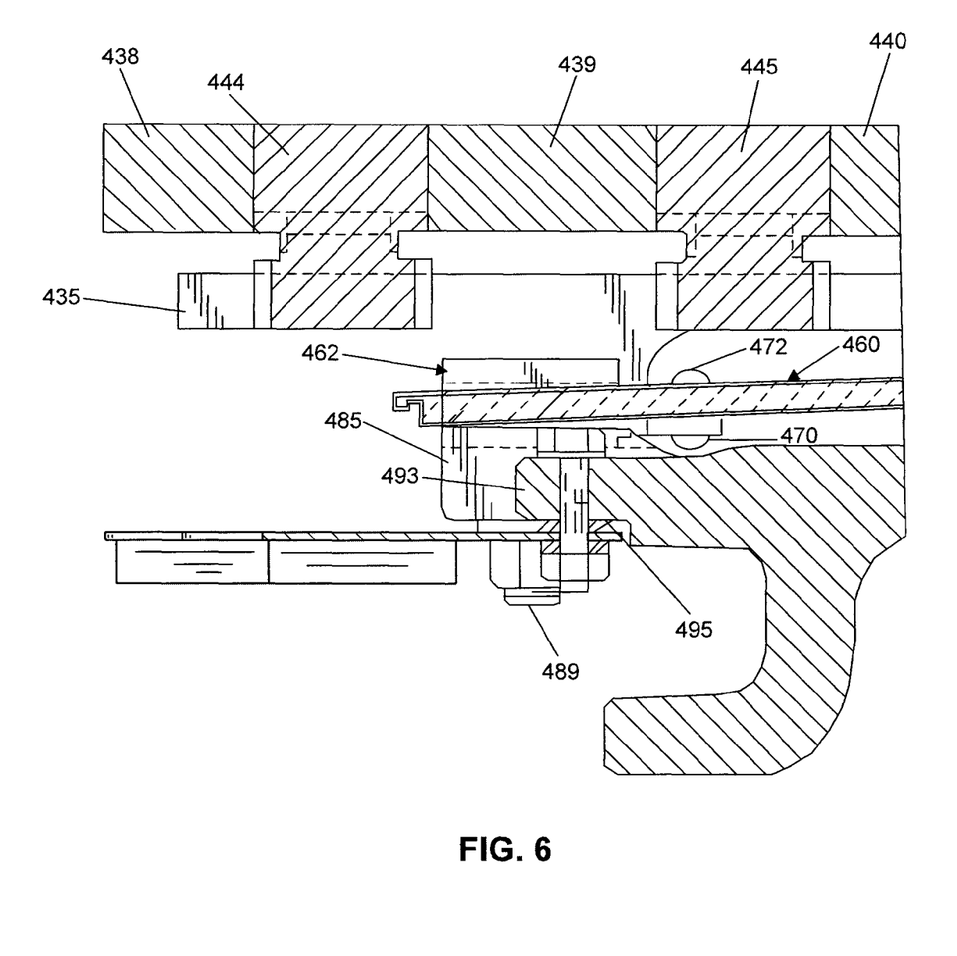
FIG. 6 illustrates a portion of the aircraft wheel and brake assembly of FIG. 4, with an installed chin ring according to various embodiments.

Chin rings in accordance with various embodiments may be mounted to any aircraft wheel. An exemplary aircraft wheel and brake assembly is illustrated in FIG. 4. FIG. 5 illustrates a portion of the aircraft wheel and brake assembly shown in FIG. 4 without a chin ring installed. FIG. 6 illustrates a portion of the aircraft wheel and brake assembly shown in FIG. 4 with an installed chin ring in accordance with various embodiments. With reference to FIGS. 4-6, friction brake mechanism 410 is for use with a cylindrical wheel 411, having matching inboard wheel section 412 and outboard wheel section 413. Each of the wheel sections 412, 413 has a corresponding respective rim member 414, 415, web member 416, 417, and hub member 418, 419. The wheel sections 412 and 413 are fastened together by suitable bolts disposed in aligned bores within web members 416 and 417 to form an integral unit. Friction brake mechanism 410 is generally symmetrical about its central axis of rotation 433.

The hub members 418 and 419 are rotatably supported by bearings 422 mounted on a nonrotatable axle member 423. A stationary carrier or boss 424 provided with a circumferentially-extending flange 425 is suitably mounted on stationary axle 423. Flange 425 has a plurality of circumferentially spaced bores 421 to receive bolts 426 for securing such flange to one end of a cylindrical torque tube 427. The other (outboard) end of torque tube 427 has an annular and radially outwardly extending reaction member 428. The reaction member 428 may be made integrally with the torque tube 427 as illustrated in FIG. 4 or may be made as a separate annular piece and suitably connected to the torque tube 427.

Torque tube 427 has on its exterior a plurality of circumferentially spaced, axially extending splines 430. Inboard wheel section 412 has a plurality of circumferentially spaced torque-transmitting bars 435 each connected to the rim flange portion 485 of wheel section 412 at their inboard ends by respective spacer means 462 to be described and at their outboard ends to the radially outward portion of web member 416 by seating in respective annular recesses 443 in such web member. The torque bars 435 may be varied in design from those shown and secured to the wheel section 412 by other suitable means.

Splines 430 support an axially non-rotatable piston end disc or stator disc 438 and inner discs 439, 440 and 441. All such non-rotatable discs 438, 439, 440 and 441 have slotted openings at circumferentially spaced locations on their respective inner peripheries for captive engagement by the splines 430. A non-rotatable annular disc or annular braking element 442 is suitably connected to the torque plate or reaction member 428 and acts in concert with the stator discs 438, 439, 440 and 441 which discs (438, 439, 440, 441 and 442) constitute the stators for the friction brake 410.

Each of a plurality of axially-spaced discs (rotor discs) 444, 445, 446 and 447 interleaved between the stator discs 438 through 442, has a plurality of circumferentially spaced openings along its respective outer periphery for engagement by the corresponding wheel torque drive 435, thereby forming the rotor discs for the friction brake 410. All the non-rotatable discs (438, 439, 440, 441 and 442) and rotatable discs (444, 445, 446 and 447) may be made from a suitable brake material such as steel or other metal or other wear-resistant material such as carbon for withstanding high temperatures and providing a heat sink. The number and size of discs may be varied as necessary for the application involved. Those stator discs and rotor discs that have circumferentially spaced openings on their respective inner and outer peripheries may accommodate reinforcing inserts to provide reinforcement to the walls of such slotted openings and to enhance the life of such slots.

The actuating mechanism or power means for the brake includes a plurality of circumferentially spaced cylinders 450 or electrically powered actuators suitably mounted on or connected to the flange 425. Within each of the cylinders 450 is a hydraulic piston or electronic actuator, which is operative to move the stator discs 438 through 441 axially into and out of engagement with their respective associated rotatable discs 444 through 447, which in turn causes the facing radial surfaces of all of the brake discs to frictionally engage their radial surfaces as they are forced toward but are resisted by the end stationary annular disc 442 and the reaction member 428 on torque tube 427. During this period of brake disc engagement, the friction forces among all the rotatable and non-rotatable discs generate considerable heat energy within the discs. It is the frictional engagement of these stator and rotor discs which produces the braking action for the aircraft wheel.

An interior wheel heat shield 460 is cylindrically shaped and is located between the inner surface 420 of wheel section 412 and the torque-transmitting bars 435. Interior wheel heat shield 460 may be formed as a single cylindrical piece or by joining together a plurality of pieces. As described above, each torque bar 435 at its outboard (wheel web) end is connected to the web member 416 by seating in an annular recess 443. The inboard (piston) end of each torque bar 435 and the adjacent portion of the interior wheel heat shield 460 is secured to inboard rim member 414 of inboard wheel section 412 by spacer 462. Spacer 462 is a rectangular shaped member that is recessed on its upper and lower surfaces to present an upper flat surface 463 with a pair of spaced abutments or shoulders that receive the sides of torque bar 435 and present a lower surface 466 with a lower pair of abutments or shoulders. Extending outboardly toward the wheel web member 416 from the rectangular shaped member of spacer 462 is a flanged portion 470 of substantially less thickness than the main body portion of spacer 462. The flanged portion 470 has a bore 471 to facilitate the securing of the spacer 462 to the interior wheel heat shield 460 by fasteners or a rivet 472.

Chin ring 490 is mounted on a plurality of flange portions 493 that extend axially inboardly from rim member 414, at circumferentially spaced apart locations with a plurality of fasteners 495 extending securing apertures of chin ring 490. Flange portions 493 lie substantially along the same arc as flange 485 of rim member 414. Chin ring 490 may comprise a chin ring in accordance with various embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An apparatus comprising:
    a substantially circular chin ring having an outer surface and a slot;
    a first radially spaced aperture in the chin ring on a first side of the slot;
    a second radially spaced aperture in the chin ring on a second side of the slot;
    a first louver disposed at least partially over the first radially spaced aperture, wherein the first louver is disposed at a first angle relative to the outer surface; and
    a second louver disposed at least partially over the second radially spaced aperture, wherein the second louver is disposed at a second angle relative to the outer surface.

2. The apparatus of claim 1, wherein the first angle is about forty-five degrees.

3. The apparatus of claim 1, wherein the second angle is about forty-five degrees.

4. The apparatus of claim 3, wherein the first louver is symmetrically disposed about an axis relative to the second louver.

5. The apparatus of claim 1, wherein at least one of the first angle and the second angle is less than about ninety degrees.

6. The apparatus of claim 1, further comprising a securing tab disposed on the chin ring.

7. The apparatus of claim 6, wherein the securing tab comprises a securing aperture.

8. A component comprising;
    a wheel housing defining a substantially cylindrical volume having a circumference;
    a chin ring having an outer surface and a slot, wherein the chin ring is circumferentially coupled to the wheel housing;

a first radially spaced aperture in the chin ring on a first side of the slot; and a second radially spaced aperture in the chin ring on a second side of the slot, wherein the chin ring comprises a first louver set comprising a first set louver and a second louver set comprising a second set louver, and wherein the first set louver is disposed at a first angle relative to the second set louver.

9. The component of claim 8, further comprising a torque bar disposed in the slot.

10. The component of claim 8, wherein the first angle is about forty-five degrees.

11. The component of claim 10, wherein the second angle is about forty-five degrees.

12. The component of claim 9, wherein the first louver is symmetrically disposed about the torque bar relative to the second louver.

13. The component of claim 12, wherein at least one of the first angle and the second angle is less than about ninety degrees.

14. The component of claim 8, wherein the chin ring is secured to the wheel housing by a fastener disposed in a securing aperture of the chin ring.

\* \* \* \* \*